US012594664B2

(12) United States Patent
Fujisawa

(10) Patent No.: US 12,594,664 B2
(45) Date of Patent: Apr. 7, 2026

(54) TERMINAL DEVICE

(71) Applicant: DAIHEN CORPORATION, Osaka (JP)

(72) Inventor: Sho Fujisawa, Osaka (JP)

(73) Assignee: DAIHEN Corporation, Osaka (JP)

( * ) Notice: Subject to any disclaimer, the term of this patent is extended or adjusted under 35 U.S.C. 154(b) by 0 days.

(21) Appl. No.: 18/644,344

(22) Filed: Apr. 24, 2024

(65) Prior Publication Data

US 2024/0375268 A1    Nov. 14, 2024

(30) Foreign Application Priority Data

May 10, 2023    (JP) ................................. 2023-077981

(51) Int. Cl.
    *G05B 19/4061*    (2006.01)
    *B25J 9/00*    (2006.01)
    *B25J 9/16*    (2006.01)
(52) U.S. Cl.
    CPC ........... *B25J 9/0081* (2013.01); *B25J 9/1666* (2013.01)
(58) Field of Classification Search
    CPC ...... B25J 9/0081; B25J 9/1697; B25J 9/1666; B25J 9/1676; B25J 9/047; B25J 9/16; B25J 13/08; G01B 11/026; G05B 11/026; G05B 2219/37425; G05B 2219/39008; G05B 2219/39094; G05B 2219/45104
    See application file for complete search history.

(56) References Cited

U.S. PATENT DOCUMENTS

| | | | |
|---|---|---|---|
| 11,597,090 B2 * | 3/2023 | Fujii .................. | G05B 19/4061 |
| 2016/0016315 A1 * | 1/2016 | Kuffner, Jr. .............. | B25J 19/06 |
| | | | 901/49 |

(Continued)

FOREIGN PATENT DOCUMENTS

| | | |
|---|---|---|
| EP | 4 155 037 A1 | 3/2023 |
| JP | 2012-223831 A | 11/2012 |

(Continued)

OTHER PUBLICATIONS

Office Action mailed on Feb. 9, 2026, in corresponding Korean patent application No. 10-2024-0048781.

*Primary Examiner* — Dalena Tran
(74) *Attorney, Agent, or Firm* — Sterne, Kessler, Goldstein & Fox P.L.L.C.

(57) ABSTRACT

A terminal device includes a coordinate-system setting portion which sets a user coordinate system on the basis of a marker included in an image, photographed by a photographing portion, including an industrial robot and a work space of the industrial robot, a coordinate giving portion which gives a coordinate of the user coordinate system to point-group data obtained by a distance measuring portion which measures a distance to an object included in the image, a region specifying portion which specifies a robot region on the user coordinate system corresponding to the industrial robot on the basis of shape size information of the industrial robot corresponding to a type of the industrial robot and attitude information of the industrial robot, and a point-group creating portion for avoidance which creates point-group data for interference avoidance by removing the point-group data included in the robot region from the point-group data obtained by the distance measuring portion.

6 Claims, 5 Drawing Sheets

(56)  References Cited

U.S. PATENT DOCUMENTS

| | | | |
|---|---|---|---|
| 2016/0112694 A1 | 4/2016 | Nishi et al. | |
| 2017/0136626 A1* | 5/2017 | Wang | G06T 7/74 |
| 2017/0282369 A1* | 10/2017 | Hull | B25J 9/1697 |
| 2021/0240194 A1 | 8/2021 | Yuguchi | |
| 2023/0098696 A1 | 3/2023 | Nakagawa | |
| 2023/0147777 A1 | 5/2023 | Ikeguchi | |
| 2023/0147940 A1 | 5/2023 | Ikeguchi | |

FOREIGN PATENT DOCUMENTS

| | | |
|---|---|---|
| JP | 5980873 | 8/2016 |
| JP | 2020-511325 | 4/2020 |
| JP | 2021-526081 | 9/2021 |
| JP | 7183372 B1 | 12/2022 |
| JP | 7190552 B1 | 12/2022 |
| JP | 2023-047280 | 4/2023 |
| KR | 10-2023-0043706 A | 2/2026 |
| WO | WO 2018/148181 | 8/2018 |

* cited by examiner

TERMINAL DEVICE

BACKGROUND

Field

The present invention relates to a terminal device.

Description of Related Art

Conventionally, in a work using a robot, in order to avoid interference with the robot and an obstruct in the periphery, an interference region in which the obstruct and the like are present is set in the periphery of the robot, and control is executed so that the robot does not advance into the inter- ference region. As a method of setting the interference region in the periphery of a robot, the following Japanese Patent No. 5980873discloses a method of setting the inter- ference region by setting different colors to the robot and the others, for example. In this method, a 3D map is created on the basis of an image of a 3D camera which photographed the robot and the periphery of the robot, removes a dot sequence corresponding to the color of the robot from each of the dot sequences of the 3D map, and sets the interference region by using position data of the dot sequence remaining on the 3D map.

SUMMARY

However, in the method of the Japanese Patent No. 5980873, such restriction is imposed that the colors of the robot and a work need to be different and moreover, distin- guishment between the color of the robot and the color of the others becomes difficult due to adhesion of stains on the robot or the work and changes in a color or brightness of lighting and the like, for example, and there is a concern that the interference region cannot be correctly specified.

Thus, this disclosure has an object to provide a terminal device which can improve accuracy of specifying the inter- ference region.

A terminal device according to an aspect of this disclosure includes a coordinate-system setting portion which sets a user coordinate system on the basis of a marker included in an image, photographed by a photographing portion, includ- ing an industrial robot and a work space of the industrial robot, a coordinate giving portion which gives a coordinate on the user coordinate system to point-group data obtained by a distance measuring portion which measures a distance to an object included in the image, a region specifying portion which specifies a robot region on the user coordinate system corresponding to the industrial robot on the basis of shape size information of the industrial robot corresponding to a type of the industrial robot and attitude information of the industrial robot, and a point-group creating portion for avoidance which creates point-group data for interference avoidance by removing the point-group data included in the robot region from the point-group data obtained by the distance measuring portion.

According to this aspect, the point-group data for inter- ference avoidance can be created by setting a user coordi- nate system on the basis of the marker included in the image obtained by photographing the industrial robot and the work space thereof, by giving a coordinate on the user coordinate system to the point-group data corresponding to an object included in the image, by specifying the robot region on the user coordinate system corresponding to the industrial robot, and by removing the point-group data included in the robot region from the point-group data corresponding to the object included in the image. As a result, the region formed on the basis of the point-group data obtained by removing the point-group data corresponding to the industrial robot from the point-group data corresponding to the photographed image can be specified as an interference region.

In the aforementioned aspect, a program creating portion which creates a work program may be further included so that the industrial robot performs a work while avoiding interference with the point-group data for interference avoidance.

According to this aspect, while avoiding the interference with the object except the industrial robot, the industrial robot can be caused to perform a work.

In the aforementioned aspect, the region specifying por- tion may specify a robot region on the user coordinate system corresponding to the industrial robot to which a tool is attached by further using shape size information of the tool corresponding to a type of the tool which can be attached to the industrial robot when the robot region is to be specified.

According to this aspect, since the region of the tool to be attached to the industrial robot can be included in the robot region, the point-group data for interference avoidance can be created on the basis of the robot region which is different depending on the tool to be attached.

In the aforementioned aspect, the type of the industrial robot and the attitude information of the industrial robot may be obtained from a control device that controls the industrial robot.

According to this aspect, since the robot region can be specified on the basis of the information obtained from the control device that controls the attitude of the industrial robot on the basis of the type of the industrial robot, accuracy of specifying the robot region can be improved.

In the aforementioned aspect, the attitude information of the industrial robot may be angle information of each axis of the industrial robot.

According to this aspect, since the robot region can be specified on the basis of the angle of each axis of the industrial robot, the robot region conforming to the angle of each axis changing in accordance with an operation of the robot can be specified.

In the aforementioned aspect, the robot region may be a region larger than a size of the industrial robot determined on the basis of the shape size information of the industrial robot and the attitude information of the industrial robot.

According to this aspect, since the point-group data included in a region larger than the size of the industrial robot can be removed, probability of removal of the point- group data corresponding to the industrial robot can be improved.

According to this disclosure, a terminal device whose accuracy of specifying the interference region can be improved can be provided.

DETAILED DESCRIPTION

With reference to the attached drawings, a preferred embodiment of the present invention will be explained. It is to be noted that, in each drawing, those with the same signs have the same or similar configurations. Moreover, since the drawings are schematic, dimensions and ratios of each of constituent elements are different from actual ones.

Figure 1:
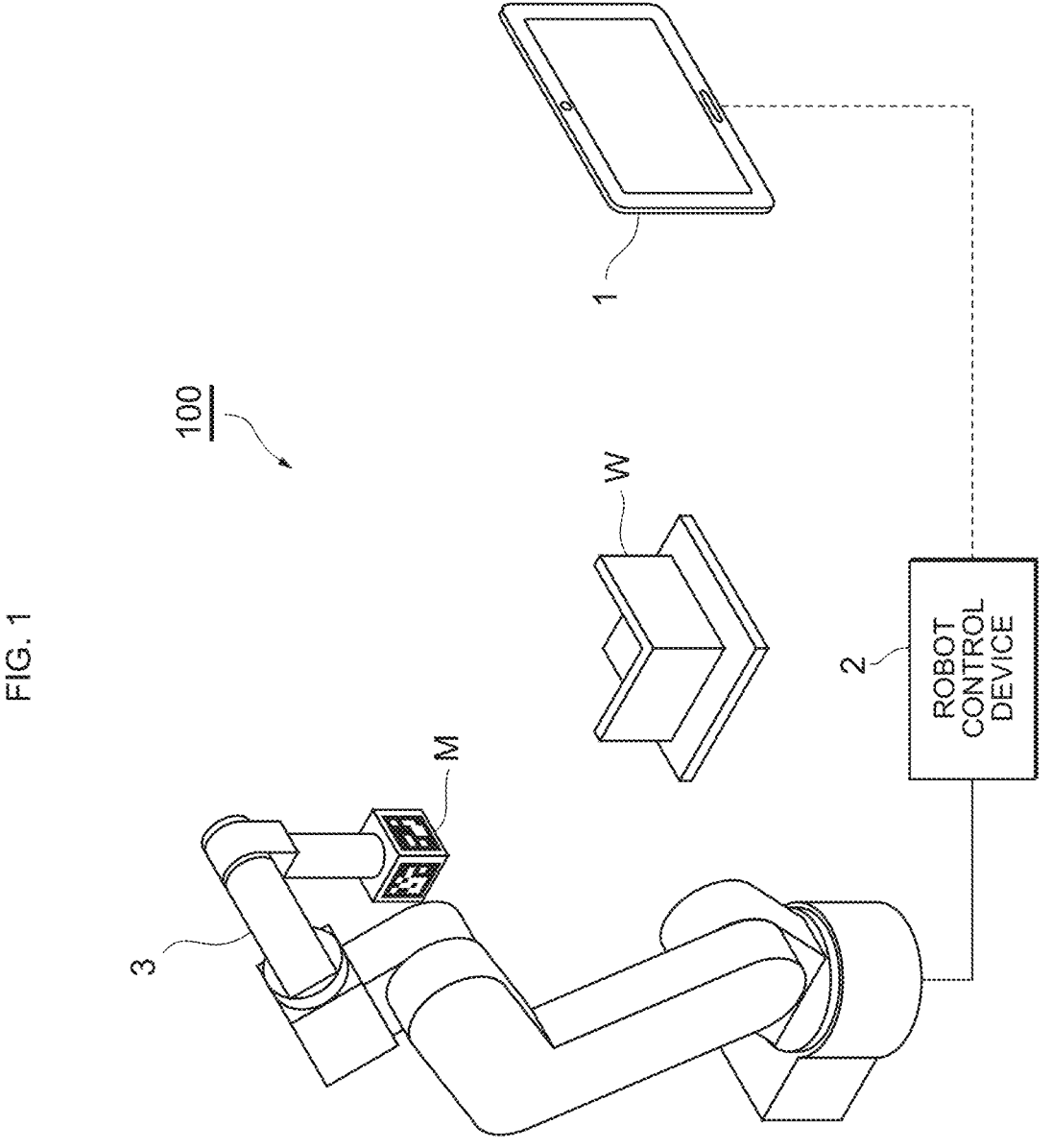
FIG. 1 is a diagram exemplifying a system configuration of a welding robot system including a terminal device according to an Embodiment.

FIG. 1 is a diagram exemplifying a system configuration of a welding robot system including a terminal device according to an Embodiment. The welding robot system 100 includes a terminal device 1, a robot control device 2, and a manipulator (industrial robot) 3, for example. The terminal device 1 and the robot control device 2 as well as the robot control device 2 and the manipulator 3 are connected to each other via a network, respectively. The terminal device 1 and the robot control device 2 are connected via wireless communication such as WiFi (Wireless Fidelity), for example, and the robot control device 2 and the manipulator 3 are connected via a communication cable, for example. It is to be noted that the network may be wired (including a communication cable) or wireless.

It is to be noted that the welding robot system 100 may include a teach pendant. The teach pendant is an operating device which can be connected to the robot control device 2 and is used when a worker teaches an operation of the manipulator 3.

The manipulator 3 is a welding robot which performs arc welding to a work W, which is a welding target, in accordance with a performing condition set in the robot control device 2. The manipulator 3 has an articulated arm provided on a base member fixed to a floor surface or the like of a plant and a welding torch (tool) coupled with a distal end of the articulated arm, for example. Here, it is supposed that a welding wire supplied to the welding torch is not included in the configuration of the manipulator 3.

To the welding torch part of the manipulator 3, a marker M is attached. The marker M only needs to be an identifier whose presence in the work space can be recognized by the terminal device 1, but preferably, an AR marker may be used. By using the AR marker, when the AR marker present in the work space is recognized, display of the user coordinate system with the AR marker as an origin superimposed on an actual image can be easily realized.

Figure 2:
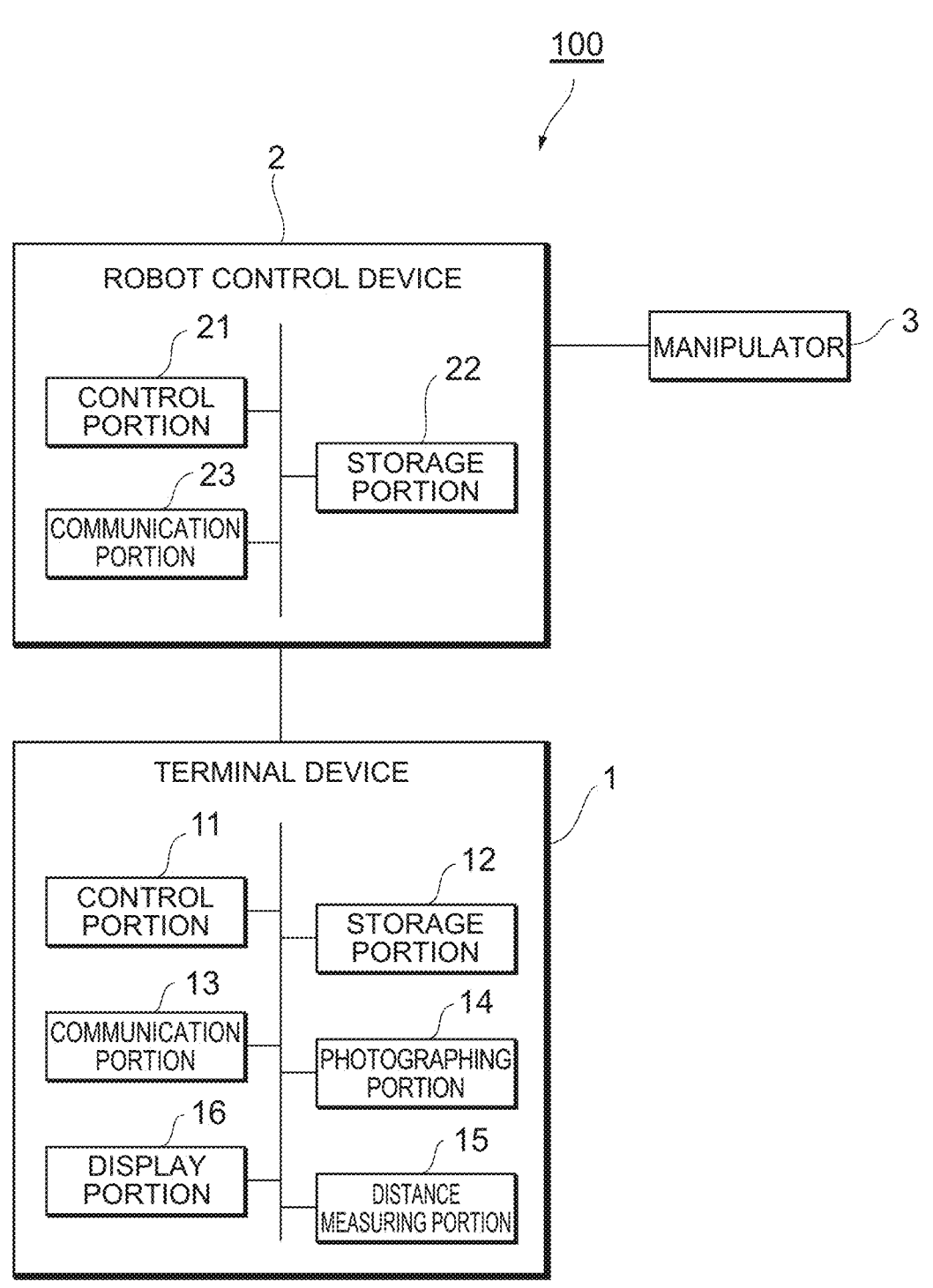
FIG. 2 is a diagram exemplifying a physical configuration of the terminal device and a robot control device shown in FIG. 1.

As shown in FIG. 2, the robot control device 2 is a control unit that controls an operation of the manipulator 3 and includes a control portion 21, a storage portion 22, and a communication portion 23, for example.

The control portion 21 is a processor and controls the manipulator 3 by executing a welding program or the like stored in the storage portion 22.

The communication portion 23 is a communication interface and controls communication with the terminal device 1 and the manipulator 3 connected via the network.

It is to be noted that the robot control device 2 may further include a welding power-source portion. The welding power-source portion supplies a welding current, a welding voltage and the like to the manipulator 3 in accordance with a welding performing condition set in advance in order to generate ark between the distal end of the welding wire and the work W, for example. The welding power-source portion may be provided separately from the robot control device 2.

The terminal device 1 is a portable terminal with a digital camera, for example. The portable terminal includes, for example, terminals capable of being carried such as a tablet terminal, a smartphone, a personal digital assistance (PDA), a note PC (personal computer) and the like. The terminal device 1 includes, for example, a control portion 11, a storage portion 12, a communication portion 13, a photographing portion 14, a distance measuring portion 15, and a display portion 16.

The control portion 11 is a processor and controls each part of the terminal device 1 by executing a program stored in the storage portion 12.

The storage portion 12 is a computer-readable recording medium and stores programs for realizing various functions of the terminal device 1 and various types of data used in the programs. The various types of data include, for example, shape size information by the type of the manipulator 3, which will be described later, and the shape size information by the type of tools to be attached to the manipulator 3.

The communication portion 13 is a communication interface and controls communication with the robot control device 2 connected via the network.

The photographing portion 14 is a 2D camera including a lens and an image sensor (image pickup element), for example, and converts light of a subject received by the lens into an electric signal (digital image data).

The distance measuring portion 15 is a 3D camera on which a distance measuring sensor is mounted, for example. The distance measuring sensor is a sensor capable of measuring a distance to a target. As the distance measuring sensor, a LiDAR (Light Detection and Ranging) sensor, a millimeter wave sensor, a supersonic sensor and the like can be used, for example.

It is to be noted that the distance measuring portion 15 may be only either one of the 3D camera and the distance measuring sensor. In a case of only the 3D camera, it is preferable that three-dimensional coordinate data corresponding to the object is calculated on the basis of a plurality of images obtained by photographing the object from a plurality of different positions. In this case, a three-dimensional measurement method by a publicly-known stereo method can be used.

Here, by including the distance measuring sensor in the terminal device 1, a positional relation between the image sensor and the distance measuring sensor can be fixed, and timing to obtain data at each sensor can be matched. Therefore, processing efficiency of setting a specified position of a marker on the point-group data, which will be described later, can be improved. Moreover, by including the image sensor and the distance measuring sensor in the terminal device 1, a worker who operates the terminal device 1 can freely move to an arbitrary position for photographing at which the manipulator 3 and the work W are photographed at the same time and thus, work efficiency can be improved.

Moreover, a sensor having both a function of an image sensor for photographing and obtaining an image and a function of a distance measuring sensor for measuring and obtaining a distance may be included in the terminal device 1. As a result, an image including a welding target and a distance to the welding target can be obtained at the same timing from the same spot and thus, the processing efficiency for setting the specified position of the marker on the point-group data, which will be described later, can be further improved.

The display portion 16 is a display having a touch panel, for example, for displaying an image of a subject photographed by the photographing portion 14 and for receiving an input of an operation instruction or the like by a worker. The display portion 16 may be provided as a display device having a touch panel separately from the terminal device 1, for example.

Figure 3:
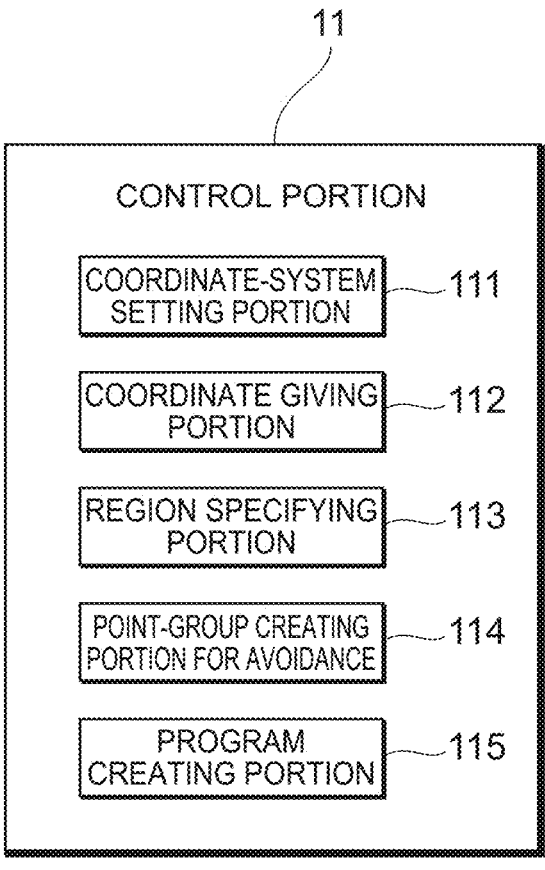
FIG. 3 is a diagram exemplifying a functional configu- ration in a control portion of the terminal device shown in FIG. 2.

FIG. 3 is a diagram exemplifying a functional configuration in the control portion 11 of the terminal device 1 according to the present invention. The control portion 11 of the terminal device 1 has, as a functional configuration, a coordinate-system setting portion 111, a coordinate giving portion 112, a region specifying portion 113, a point-group creating portion 114 for avoidance, and a program creating portion 115, for example.

The coordinate-system setting portion 111 sets a three-dimensional user coordinate system on the basis of the marker M included in the image photographed by the photographing portion 14. As shown in FIG. 1, the image photographed by the photographing portion 14 includes the manipulator 3 and the work W present in the space where the manipulator 3 works, for example. To the distal end of an arm of the manipulator 3, the marker M is attached.

Specifically, the coordinate-system setting portion 111 sets the three-dimensional user coordinate system with a specified position of the marker M (a corner of the marker, a center of the marker or the like, for example) as the origin.

It is to be noted that the origin of the user coordinate system is not limited to the specified position of the marker M but may be an origin of a robot coordinate system determined with the specified position of the marker M as a reference. Specifically, by fixing the position of the marker M with respect to the manipulator 3, the specified position of the marker M can be specified on the robot coordinate system and thus, the origin of the robot coordinate system can be specified with the specified position of the marker M as a reference. The user coordinate system in this case is the robot coordinate system.

The coordinate giving portion 112 gives a coordinate of the user coordinate system to the point-group data obtained by the distance measuring portion 15 which measures a distance to the object included in the image photographed by the photographing portion 14.

Specific explanation will be made. The coordinate giving portion 112 detects the specified position of the marker M on the basis of the image photographed by the photographing portion 14 and sets the specified position of the marker so detected on the point-group data obtained by the distance measuring portion 15. The coordinate giving portion 112 gives the coordinate in the user coordinate system with the specified position of the marker set on the point-group data as the origin (reference) to the point-group data. As a result, the point-group data is drawn on the user coordinate system. Regarding the specified position of the marker set on the point-group data, the specified position of the marker on the point-group data may be automatically recognized by data analysis or may be specified by the worker's pointing out of the specified position of the marker on the point-group data or the like, for example.

The region specifying portion 113 specifies the robot region on the user coordinate system corresponding to the manipulator 3 on the basis of the shape size information of the manipulator 3 corresponding to the type of the manipulator 3 and the attitude information of the manipulator 3.

The type of the manipulator 3 and the attitude information of the manipulator 3 are preferably obtained from the robot control device 2 which controls the manipulator 3. The attitude information of the manipulator 3 may be angle information of each axis of the manipulator 3, for example.

The region specifying portion 113 may specify the robot region on the user coordinate system corresponding to the manipulator 3 at the attachment of the tool by further using the shape size information of the tool corresponding to the type of the tool such as the welding torch to be attached to the manipulator 3 when the robot region is to be specified.

Figure 4:
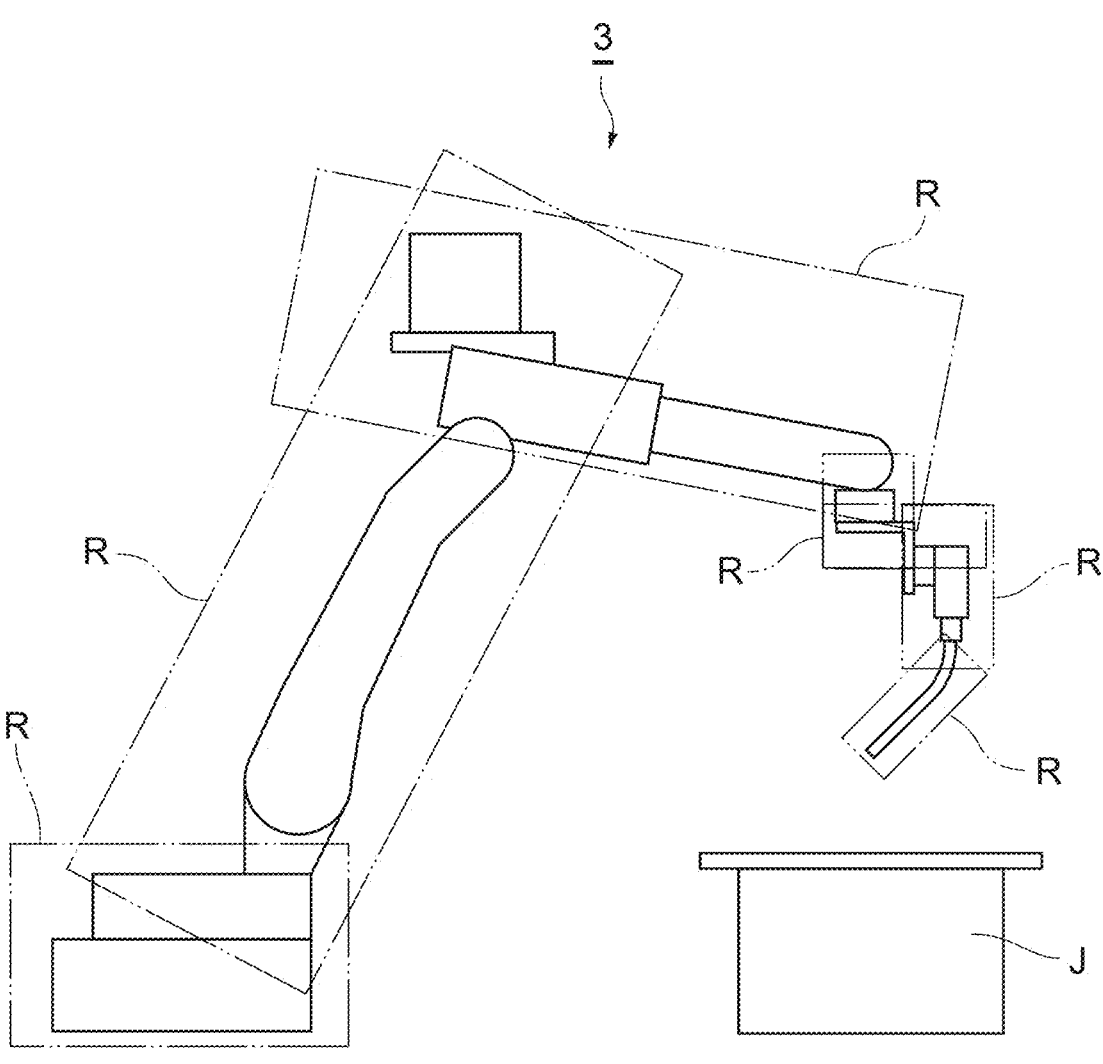
FIG. 4 is a schematic diagram for explaining a robot region.

The robot region may be preferably a region larger than the size of the manipulator 3 at the tool attachment determined on the basis of the shape size information of the manipulator 3, the attitude information of the manipulator 3, and the shape size information of the tool. With reference to FIG. 4, the robot region will be explained specifically.

FIG. 4 displays the work space of the manipulator 3 including the manipulator 3 to which the welding torch, which is a tool, is attached and a jig J for disposing the work. A robot region R is provided so as to surround the entire manipulator 3 to which the welding torch is attached, and the robot region is not provided in the work space other than that including the jig J. The robot region R is provided in a range larger than the manipulator 3 to which the welding torch is attached.

A range larger than the manipulator 3 to which the welding torch is attached is, for example, a range which can absorb an error that can occur in the point-group data obtained by the distance measuring portion 15 and preferably has a size with allowance with respect to a size of the manipulator 3 when the welding torch is attached. As a result, the robot region R can be specified by removing an influence by an error that can occur in the point-group data and thus, a quality of the point-group data for interference avoidance can be improved.

The point-group creating portion 114 for avoidance removes the point-group data included in the robot region R from the point-group data obtained by the distance measuring portion 15 so as to create the point-group data for interference avoidance. In FIG. 4, in the point-group data obtained by the distance measuring portion 15, the point-group data included in the robot region R is removed, and the remaining point-group data corresponding to the jig J is created as the point-group data for interference avoidance.

The program creating portion 115 creates a welding program so that the manipulator 3 performs a welding operation while avoiding interference with the point-group data for interference avoidance.

Here, the interference in this Embodiment refers to hindrance to the welding operation of the manipulator 3 (a normal welding operation is hindered) by contact with an object corresponding to the point-group data for interference avoidance or the like when the manipulator 3 performs the welding operation.

Specifically, the program creating portion 115 creates a welding program so that the manipulator 3 virtually placed on the user coordinate system avoids interference with the point-group data for interference avoidance drawn on the user coordinate system and follows a welding line of a welding target.

More specifically, when it is determined that there is a spot where the manipulator 3 interferes with the point-group data for interference avoidance in an operation locus of the manipulator 3 in the user coordinate system, the program creating portion 115 changes a part of the operation locus of the manipulator 3 in a direction in which the interference with the point-group data for interference avoidance can be avoided. On the other hand, when it is determined that there is no spot interfering with the point-group data for interference avoidance in the operation locus, the program creating portion 115 creates a welding program by converting the operation locus in the user coordinate system to an operation locus in the robot coordinate system.

A position at which the manipulator 3 is virtually placed can be arbitrarily specified when the worker touches an image of the work space or the like in accordance with a guide such as a sound or a character message or the like, for example.

Moreover, the virtually placed manipulator 3 may be a model to which a wire supply device, various sensors and the like are connected, for example.

The program creating portion 115 transmits the created welding program to the robot control device 2 and causes it to be stored in the storage portion 22 of the robot control device 2. As a result, when the manipulator 3 performs arc welding, the control portion 21 of the robot control device 2 reads the welding program and can control the manipulator 3 so that the arc welding is performed while avoiding interference with an object in accordance with the welding procedure specified by the welding program.

Figure 5:
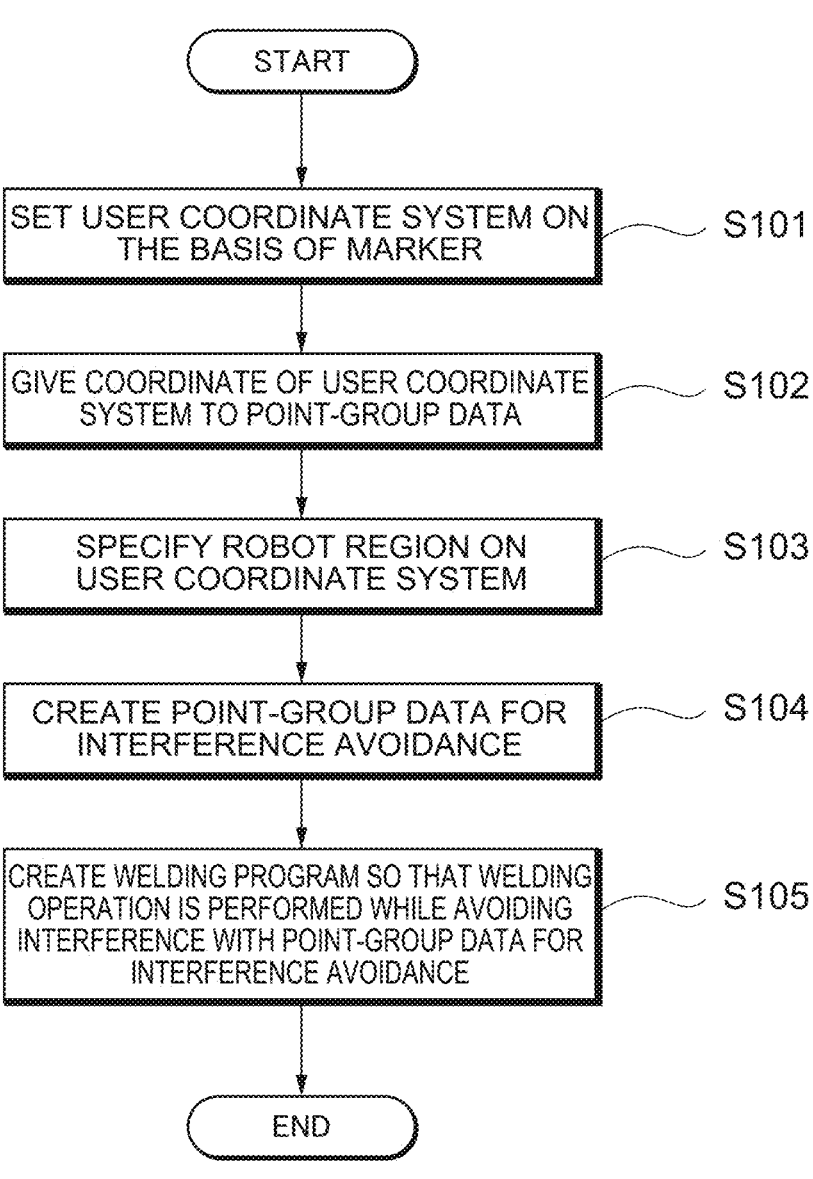
FIG. 5 is a flowchart for explaining an example of an operation of the terminal device.

With reference to FIG. 5, an example of the operation of the terminal device 1 will be explained.

First, the coordinate-system setting portion 111 of the terminal device 1 sets the three-dimensional user coordinate system on the basis of the marker M included in the image photographed by the photographing portion 14 (Step S101).

Subsequently, the coordinate giving portion 112 of the terminal device 1 gives a coordinate of the user coordinate system to the point-group data obtained by the distance measuring portion 15 (Step S102).

Subsequently, the region specifying portion 113 of the terminal device 1 specifies the robot region on the user coordinate system corresponding to the manipulator 3 when the welding torch is attached on the basis of the shape size information of the manipulator 3, the attitude information of the manipulator 3 and the shape size information of the tool (Step S103).

Subsequently, the point-group creating portion 114 for avoidance of the terminal device 1 creates point-group data for interference avoidance by removing the point-group data included in the robot region specified at the aforementioned Step S103 from the point-group data obtained by the distance measuring portion 15 (Step S104).

Subsequently, the program creating portion 115 of the terminal device 1 creates a welding program so that the manipulator 3 performs the welding operation while avoiding interference with the point-group data for interference avoidance created at the aforementioned Step S104 (Step S105). Then, the operation is finished.

As described above, according to the terminal device 1 according to the Embodiment, the user coordinate system is set on the basis of the marker M included in the image obtained by photographing the manipulator 3 and the work space thereof, gives the coordinate of the user coordinate system to the point-group data corresponding to the object included in the image so as to specify the robot region R on the user coordinate system corresponding to the manipulator 3 and can create the point-group data for interference avoidance by removing the point-group data included in the robot region R from the point-group data corresponding to the object included in the image. As a result, the region formed on the basis of the point-group data obtained by removing the point-group data corresponding to the manipulator 3 from the point-group data corresponding to the photographed image can be specified as the interference region.

Therefore, according to the terminal device 1 according to the Embodiment, accuracy to specify the interference region can be improved.

It is to be noted that this disclosure is not limited to the aforementioned Embodiment but can be worked in the other various forms within a range not departing from the gist of this disclosure. Therefore, the aforementioned Embodiment is only exemplification in any point and should not be interpreted in a limited manner.

For example, in the aforementioned Embodiment, the explanation was made by using the welding robot, but this is not limiting. This disclosure can be applied to an industrial robot including a handling robot performing picking or the like, for example. In this case, the welding program, the welding target, the welding line, and the welding operation used in the aforementioned Embodiment can be replaced with a work program, a work target, a work spot, and a work, respectively.

Moreover, in the aforementioned Embodiment, the image of the work space including the manipulator 3 is photographed by one unit of the terminal device 1, but an image of a work space including the manipulator 3 may be photographed from different positions, respectively, by using a plurality of the terminal devices 1. As a result, presence/absence of interference is determined at each photographing position, and when it is determined that there is interference, adjustment can be made so as to avoid the interference. Therefore, the accuracy to avoid the interference can be improved.

What is claimed is:

1. A terminal device comprising:
   a coordinate-system setting portion which sets a user coordinate system on the basis of a marker included in an image, photographed by a photographing portion, including an industrial robot and a workspace of the industrial robot;
   a coordinate giving portion which gives a coordinate of the user coordinate system to point-group data obtained by a distance measuring portion which measures a distance to an object included in the image;
   a region specifying portion which specifies a robot region on the user coordinate system corresponding to the industrial robot on the basis of shape size information of the industrial robot corresponding to a type of the industrial robot and attitude information of the industrial robot; and
   a point-group creating portion for avoidance which creates point-group data for interference avoidance by removing the point-group data included in the robot region from the point-group data obtained by the distance measuring portion.

2. The terminal device according to claim 1, further comprising:
   a program creating portion which creates a work program such that the industrial robot performs a work while avoiding interference with the point-group data for interference avoidance.

3. The terminal device according to claim 1, wherein
   when the robot region is to be specified, by further using shape size information of the tool corresponding to a type of a tool which can be attached to the industrial robot, the region specifying portion specifies the robot region on the user coordinate system corresponding to the industrial robot to which the tool is attached.

4. The terminal device according to claim 1, wherein
the type of the industrial robot and the attitude informa-
tion of the industrial robot are obtained from a control
device that controls the industrial robot.

5. The terminal device according to claim 1, wherein
the attitude information of the industrial robot is angle
information of each axis of the industrial robot.

6. The terminal device according to claim 1, wherein
the robot region is a region larger than a size of the
industrial robot determined on the basis of shape size
information of the industrial robot and attitude infor-
mation of the industrial robot.

* * * * *